US011290219B2

(12) United States Patent
Gonzalves Serrano et al.

(10) Patent No.: US 11,290,219 B2
(45) Date of Patent: Mar. 29, 2022

(54) METHOD FOR TRANSMITTING A STREAM IN A WIRELESS NETWORK FROM A WIRELESS COMMUNICATION DEVICE TO A PLURALITY OF WIRELESS COMMUNICATION

(71) Applicants: Bayerische Motoren Werke AG, Munich (DE); Huawei Technologies Co. Ltd., Shenzhen (CN)

(72) Inventors: David Gonzalves Serrano, Munich (DE); Mladen Botsov, Munich (DE); Liang Hu, Munich (DE); Markus Dillinger, Oberhaching (DE)

(73) Assignees: Bayerische Motoren Werke AG, Munich (DE); Huawei Technologies Co. Ltd., Shenzhen (CN)

( * ) Notice: Subject to any disclaimer, the term of this patent is extended or adjusted under 35 U.S.C. 154(b) by 0 days.

(21) Appl. No.: 16/062,918

(22) PCT Filed: Dec. 18, 2015

(86) PCT No.: PCT/IB2015/059782
§ 371 (c)(1),
(2) Date: Jun. 15, 2018

(87) PCT Pub. No.: WO2017/103662
PCT Pub. Date: Jun. 22, 2017

(65) Prior Publication Data
US 2018/0367261 A1 Dec. 20, 2018

(51) Int. Cl.
H04L 1/18 (2006.01)
H04L 1/00 (2006.01)
(Continued)

(52) U.S. Cl.
CPC .......... H04L 1/1854 (2013.01); H04L 1/0026 (2013.01); H04L 1/0027 (2013.01);
(Continued)

(58) Field of Classification Search
CPC ....... H04L 1/1854; H04L 1/1812; H04W 4/46
See application file for complete search history.

(56) References Cited

U.S. PATENT DOCUMENTS

| 2003/0018794 A1* | 1/2003 | Zhang | ................. H04L 65/1026 709/231 |
| 2009/0060081 A1* | 3/2009 | Zhang | ................... H04L 5/0051 375/267 |

(Continued)

FOREIGN PATENT DOCUMENTS

| DE | 10 2014 010 086 A1 | 7/2015 |
| EP | 1 482 671 A1 | 12/2004 |

(Continued)

*Primary Examiner* — Jianye Wu
(74) *Attorney, Agent, or Firm* — Bryan W. Bockhop; Bockhop Intellectual Property Law, LLC

(57) ABSTRACT

The invention discloses a method for receiving a data packet from a first communication device by a second communication device in a wireless network comprising the following steps: —awaiting the data packet at the second communication device; determining a context information related to the data packet by the second communication device; if the data packet is not received successfully, controlling transmission of a negative acknowledgement indicator, NACK, and/or transmission of a channel quality indicator, CQI, by the second communication device to the first communication device based on the context information.

9 Claims, 8 Drawing Sheets

(51) Int. Cl.
*H04L 1/16* (2006.01)
*H04W 4/46* (2018.01)

(52) U.S. Cl.
CPC .......... *H04L 1/0029* (2013.01); *H04L 1/1671* (2013.01); *H04L 1/1812* (2013.01); *H04L 2001/0093* (2013.01); *H04W 4/46* (2018.02)

(56) References Cited

U.S. PATENT DOCUMENTS

| | | |
|---|---|---|
| 2009/0323577 A1 | 12/2009 | Agrawal et al. |
| 2012/0083262 A1* | 4/2012 | Dimou .............. H04W 36/0079 455/423 |
| 2012/0163252 A1 | 6/2012 | Ahn et al. |
| 2012/0207100 A1* | 8/2012 | Hakola ................ H04W 76/14 370/329 |
| 2014/0173372 A1 | 6/2014 | Maaref et al. |
| 2015/0023267 A1* | 1/2015 | Lim .................. H04W 72/0406 370/329 |
| 2015/0172003 A1* | 6/2015 | Kim ...................... H04L 5/0055 370/281 |
| 2016/0173208 A1* | 6/2016 | Kuchi ................ H04W 88/085 375/267 |

FOREIGN PATENT DOCUMENTS

| | | |
|---|---|---|
| WO | 2008/084979 A2 | 7/2008 |
| WO | 2010/020078 A1 | 2/2010 |
| WO | 2011/106931 A1 | 9/2011 |

* cited by examiner

METHOD FOR TRANSMITTING A STREAM IN A WIRELESS NETWORK FROM A WIRELESS COMMUNICATION DEVICE TO A PLURALITY OF WIRELESS COMMUNICATION

BACKGROUND

The present invention relates to a method for transmitting a stream in a wireless network from a wireless communication device to a plurality of wireless communication devices, particularly in an automotive environment.

Cooperative Intelligent Transport Systems (C-ITS) as discussed in Intelligent Transport Systems (ITS); Vehicular Communications; Basic Set of Applications; Definitions, ETSI Technical Report TR 102 638 Rev. 1.1.1, 2009 are based on the exchange of messages between vehicles (Vehicle-to-Vehicle communication, V2V) and between vehicles and roadside units (Vehicle-to-Infrastructure communication, V2I) and aim to improve traffic safety and efficiency. This exchange is generally accomplished by means of wireless communications based on, for instance, Wireless Local Area Network (WLAN) communication standards. In the case of cooperative traffic safety applications, each vehicle regularly broadcasts beacons with its position, velocity, trajectory and other useful data to all the vehicles and devices in its vicinity.

The European and American systems for C-ITS are known as ETSI ITS-G5 and Wireless Access in Vehicular Environments (WAVE), respectively (IEEE Standard for Information Technology—Telecommunications and Information Exchange Between Systems-Local and Metropolitan Area Networks-Specific Requirements-Part 11: Wireless LAN Medium Access Control (MAC) and Physical Layer (PHY) Specifications," IEEE Std 802.11-1997, vol., no., pp.i, 445, 1997). Both of these systems operate at 5.9 GHz and are based on the IEEE 802.11p standard, which defines the physical (PHY) and Medium Access Control (MAC) layers based on previous standards for WLAN. In addition to systems based on the 802.11p standard, the use of cellular systems has been recently proposed in order to enable V2V and V2I communication (collectively, V2X). In particular, future evolutions of the LTE technology are expected to enable the direct communication between devices (that is, without going through the cellular infrastructure), a characteristic that is usually referred to as device-to-device (D2D) communication. The use of device-to-device communication has the potential to provide better Quality of Service (QoS) for cooperative traffic safety applications than legacy systems due to presence of cellular infrastructure, which can provide management and control features (such as radio resource allocation) to the direct communication between traffic participants.

Wireless communication systems incorporate a variety of techniques in order to cope with the impairments of the wireless propagation channel, and provide a certain level of reliability to services and applications. Adaptive modulation and coding (AMC) is used in order to match the modulation, coding and other signal and protocol parameters to the conditions on the radio link and enables more efficient resource utilization. Nevertheless, interference and noise cause some of the transmissions to be received erroneously. Automatic repeat request (ARQ) is a control mechanism that allows a receiver to detect an error in a received message with the aid of error-detecting codes and request a new transmission in case of corruption. Hybrid ARQ (HARQ) further introduces Forward Error Correction (FEC) coding, where the added parity bits can be used to repair a corrupted message.

Limitations in the Current State of the Art

Broadcast transmissions like the ones commonly used in the case of C-ITS generally do not support HARQ or AMC mechanisms due to scalability problems. In the case of broadcast transmissions, the use of HARQ or AMC mechanisms can lead to a very high number of feedback messages (positive acknowledgments, ACK, and negative acknowledgments, NACK), which create excessive redundant traffic in the wireless medium and can hamper the network performance. In addition to the feedback "storm" caused by the intended receivers, receivers outside of the desired coverage area might also attempt to request further retransmissions, which results in additional overhead and interference.

Consequently, broadcast transmissions need to be configured with very robust modulation and coding settings in order to enable reliable transmissions in the absence of HARQ and AMC mechanisms. This, however, reduces the spectral efficiency of the wireless communication systems.

US 2009/032577 A1 discloses sending a NACK and a channel quality indicator for a broadcast packet in a conventional mobile network.

WO 2008/021573 A2 relates to ACK/NACK of the MBMS service.

WO 2011/106931 A1 discloses a cluster head that manages a plurality of user equipments during broadcast transmissions in a cellular communication system.

DE 10 2005 018 455 A1 relates to broadcast in High Speed Downlink Packet Access networks.

US 2012/0163252 relates to hybrid automatic repeat request (HARQ) and adaptive transmission, when device to device link communication is performed using one of an uplink band and a downlink band in a time division duplex (TDD) cellular communication system or frequency-division duplex (FDD) cellular communication system.

EP 1 482 671 A1 discloses that link communication is performed using one of an uplink band and a downlink band in a time division duplex (TDD) cellular communication system or frequency-division duplex (FDD) cellular communication system. The broadcast channel transmission are then adjusted, depending upon the proportion of positive acknowledgements and/or negative acknowledgements that the broadcast transmitter receives over those bi-directional links to which it is connected.

WO 2010/020078 A1 relates to a method of implementing hybrid automatic repeat request (HARQ) in enhanced multimedia multicast/broadcast service.

WO 2008/085989 A2 discloses a method of transmission/reception of data according to a hybrid automatic repeat request (HARQ) process.

US 2014/0173372 A1 relates to a system and method embodiments that are provided to support network communications with groups of user equipments. The embodiments include a two-level group-based hybrid-automatic repeat request (HARQ) mechanism and acknowledgement (ACK)/negative ACK (NACK) feedback.

It is an object of the present invention to provide a method for reliably transmitting multicast and/or broadcast packets in a device-to-device network that does not impose a heavy load on the network resources.

SUMMARY OF THE INVENTION

The object of the present invention is achieved by a method according to claim 1, a method according to claim 10, a controller according to claim 16, a communication device according to claim 17 and a vehicle according to claim 18. The depending claims relate to preferred embodiments.

An inventive method for receiving a data packet from a first communication device by a second communication device in a wireless network comprises the step of awaiting the data packet at the second communication device and determining a context information related to the data packet by the second communication device. If the data packet is not received successfully, transmission of a negative acknowledgment indicator, NACK, and/or transmission of a channel quality indicator, CQI, by the second communication device to the first communication device is controlled based on the context information.

The channel quality indicator may be any indicator indicating the quality of the transmission such as signal to noise ratio, bit error rate, signal strength or the like. The channel quality indicator may be determined by use of received signals and thus may also indicate the quality of reception.

The first communication device and the second communication device may be cellular communication devices. The communication devices may in particular be a user equipment. Generally, the communication devices are adapted to communicate via a base station and a core network.

The communication device may be installed and/or operated in a vehicle. It may be connected to at least one electronic control unit (ECU) of the vehicle by wire and/or wireless. The communication device may act as a user equipment in the mobile network. In another embodiment the communication device may be a user equipment carried by a driver or passenger of the vehicle. The user equipment may be a personal electronic device such as a mobile phone.

In one embodiment the communication devices may communicate directly without sending the data packets transmitted to another communication device to a base station, e.g., by device-to-device communication, in particular by car-to-car communication.

The term context information may comprise meta information, such as information about another communication device, environment information, information about the communication ability of a third communication device, area information, reception and/or transmission ability of a third communication device, time information, the status of a communication device and the like. The context information may comprise any information about the transmission environment that is not directly linked to decoding the data packet.

The step of awaiting a data packet may include in one embodiment controlling, whether all bits has been successfully received and decoded. The step of awaiting a data packet may include reception of a certain amount of bits, such that the method can determine, whether all bits have been successfully received. Determination whether the data packet has been successfully received is not bound to a bits and may be based on symbols or the like.

The method may be adapted to not send a positive acknowledgment, ACK, by the second communication device, if a data packet has been successfully received. Thereby, network load may be reduced.

Regarding said control of transmission of a NACK and/or a CQI, by the second communication device, based on the context information, the term "based on the context information" may in particular comprise the term "depending on the content information".

If the context information indicates that another communication device has already sent a negative acknowledgment and/or a CGI, the negative acknowledgment and/or the channel quality indicator is not transmitted in one embodiment of the second communication device. The context information may indicate, whether the negative acknowledgment and/or the channel quality indicator is to be transmitted in one embodiment by the second communication device.

In another embodiment the context information may indicate, whether the negative acknowledgment and/or the channel quality indicator will be received by the first communication device such that a retransmitted data packet of the data packet will arrive at the second user equipment in an appropriate time frame and vice versa. Based on the context information load of the network may be reduced, if a negative acknowledgment and/or the channel quality indicator are only transmitted, if retransmission of the data packet is useful for in the current application context.

In another embodiment the received by data packet be a multicast/broadcast transmissions.

In a further embodiment the step of transmitting the negative acknowledgment and/or the channel quality indicator may comprise a broadcast/multicast and/or a multichannel transmission.

In another embodiment the second communication device may receive a retransmitted packet of the data packet transmitted by a third communication device. The third communication device may have received the original data packet transmitted by the first communication device appropriately. The third communication device may have received the negative acknowledgment and/or channel quality indicator transmitted by the second communication device. The third communication device may act as a hub for transmitting the data packet that was not successfully received by the second communication equipment.

In one embodiment the context information may comprise information indicating, whether another communication device transmits a negative acknowledgment and/or a channel quality indicator. The second communication device may not transmit a negative acknowledgment and/or a channel quality indicator, if another communication device transmits and/or has transmitted a negative acknowledgment and/or a channel quality indicator related to the data packet. Thereby, network load may be reduced, since less negative acknowledgment messages and channel quality indicator messages are transmitted by the network.

In another embodiment the context information may comprise at least one channel quality indicator transmitted by another communication device related to the data packet. The data packet may be transmitted by the first communication device. The other communication device may be a third, a fourth communication device or the like. The negative acknowledgment and/or the channel quality indicator may not be transmitted, if at least one channel quality indicator transmitted by another communication device is worse than the channel quality indicator determined by the second communication device. Also thereby, network load may be reduced. The negative acknowledgment indicator and/or the channel quality indicator is only transmitted, if the channel quality indicator transmitted by another communication device is better than the channel quality indicator determined by the second communication device.

If the data packet is not successfully received by the second communication device, the second communication device waits in another embodiment a time span before transmitting the negative acknowledgment and/or the channel quality indicator. The time span may depend on the channel quality indicator, particularly the time span is longer the better of the channel quality indicator is. Also thereby, network load may be reduced by avoiding multiple transmission of channel quality indicators.

In another embodiment the context information may comprise information indicating whether the second communication device can receive a retransmitted data packet of the data packet transmitted by the first communication device and transmit the negative acknowledgment and/or the channel quality indicator, if the second communication device can receive the retransmitted data packet. This embodiment also reduces network load, since the data packet is only retransmitted, if it can actually be received by the second communication device.

In a further embodiment the context information may comprise a distance of the second communication device to a source of the data packet, particularly the first communication device, and transmit the negative acknowledgment and/or the channel quality indicator, if the distance exceeds a predefined threshold. In an alternative embodiment the negative acknowledgment and/or the channel quality indicator is only transmitted, if the distance is below a predetermined threshold. Thereby, the method may determine, whether it is appropriate to retransmit the data packet in the present application context.

In another embodiment the context information may comprise a time limit, within which a retransmitted data packet of the data packet transmitted by the first communication device has to be received by the second communication device. The negative acknowledgment and/or the channel quality indicator is only transmitted, if the data packet will arrive at the second communication device within the time limit. Also this embodiment reduces network load, since no negative acknowledgment, no channel quality indicator and no retransmitted data packet are transmitted over the network, if the retransmitted data packet will not be received within a time limit defined by the current application context.

The object of the present invention is also solved by a method for transmitting a multicast/broadcast data packet by a first communication device in a wireless network with a plurality of wireless communications devices, wherein the method comprises transmitting, as an initial transmission, the multicast/broadcast data packet to a plurality of wireless communications devices. The method comprises also the step of receiving a negative acknowledgment and/or a channel quality indicator. The method determines a context information related to the data packet. The method further comprises the step of retransmitting the data packet depending on the context information. Accordingly, the retransmission of the data packet is controlled by use of the context information. The data packet may be retransmitted with a decreased priority. In one embodiment the priority may be selected depending on the context information.

In one embodiment the context information may comprise information indicating, whether radio resources are available for retransmitting the multicast/broadcast packet. The multicast/broadcast packet is only retransmitted, if radio resources are available. Thereby, network congestion may be avoided.

In one embodiment the method may comprise the step of retransmitting the data packet on a channel different from the channel is used for the initial transmission of the data packet. Only communication devices that did not receive the initial transmission of the data packet have to decode the channel different from the channel used for the initial transmission.

In another embodiment the context information may comprise a time limit, within which a retransmitted packet has to be received by the at least one intended communication device. The intended commutation device may be the second communication device. The data packet is only retransmitted, if the data packet will arrive at the at least one intended commutation device within the time limit. Thereby, network load may be reduced further.

In another embodiment the method may determine the communication device, which returned the worst channel quality indicator. The method may adapt at least one radio parameter based on the worst channel quality key indicator in order to improve reception quality and to reduce total network load.

In another embodiment of the step of transmitting a negative acknowledgment indicator may comprise sending a previous frame ID and/or the device ID as an indicator for a negative acknowledgment. Thereby, network load may be reduced, since no negative acknowledgments are transmitted. Reception of a previous frame ID and/or a device ID substitutes the negative acknowledgment.

The object of the invention is also solved by a controller configured to perform at least one of the methods according to the preceding claims. The controller may comprise a first device adapted to await a data packet from another communication device. The communication device may comprise a second device adapted to determine context information related to the data packet. The controller may be adapted to control transmission of a negative acknowledgment indicator and/or transmission of a channel quality indicator based on the context information, if the data packet is not received successfully.

The controller may comprise a transmission device adapted to transmit as an initial transmission a multicast/broadcast data packet to a plurality of wireless communication devices. The controller may comprise a receiving device adapted to receive a negative acknowledgment and/or a channel quality indicator. The controller may comprise a context determining device adapted to determine context information related to the data packet. The controller may comprise a retransmission device adapted to retransmit the data packet depending on the context information. The retransmission device may retransmit the data packet with a lower priority relative to the initial transmission.

The controller may be configured as described above with respect to the method.

The invention also relates to a communication device comprising the above controller.

The invention also relates to a vehicle comprising the above communication device.

The invention also relates to a method of transmitting a multicast/broadcast stream in a wireless network from a first wireless communication device to a plurality of wireless communication devices comprising the steps of transmitting the multicast/broadcast packet directly from a first communication device to a plurality of communication devices including a second communication device by a first priority on a first common channel, and receiving at the second communication device the multicast/broadcast packet transmitted from the first communication device. The method decodes the received multicast/broadcast packet at the second communication device. The method further determines a reception quality indicator of and/or relating to the multicast packet/broadcast packet received by the second communication device. If the multicast/broadcast packet has been successfully received and decoded by the communication device, no positive acknowledgment, ACK, and no channel quality indicator, CQI, is transmitted by the second communication device to the first communication device. If the multicast/broadcast packet has not been successfully received and/or has not successfully been decoded by the second communication device, a negative acknowledgment indicator, NACK, and/or a channel quality indicator, CQI, is transmitted by the second communication device to the first communication device on a shared control channel shared by the plurality of communication devices. In particular, the first communication device may transmit the multicast/broadcast packets to the plurality of communication devices without transmitting the multicast/broadcast packets to a base station. The reception quality indicator may be a channel quality indicator, CQI, or may be derived from or comprise a CQI, which may be any indicator indicating the quality of the transmission such as signal to noise ratio, bit error rate, signal strength or the like.

Since no positive acknowledgment is sent by the inventive method, network load is significantly decreased during multicast/broadcast transmissions. Further, network load is decreased, since no channel quality indicator is transmitted by the second communication device, if a data packet has been successfully received and decoded. If a packet has not been successfully received by the second communication device an implicit negative acknowledgement may be transmitted by only transmitting the quality channel indicator CQI. Thus, the inventive method proposes to transmit no positive acknowledgment and no quality channel indicator, if the packet has been successfully received and decoded by the second communication device. Further, the inventive method proposes to transmit only a channel quality indicator, if the packet has not been successfully received and/or decoded by the second communication device during multicast/broadcast transmissions. Thereby, the network load during multicast/broadcast transmissions can be significantly reduced. The second communication device does not have to transmit an explicit negative acknowledgment. The step of transmitting the negative acknowledgment indicator and/or the quality channel indicator may include multicasting/broadcasting the negative acknowledgment indicator and/or multicasting/broadcasting the channel quality indicator. Thereby, other communication devices in the mobile network are informed that the second communication device did not receive the multicast/broadcast packet. This enables that other communication devices may act as a hub for transmitting the multicast/broadcast packet.

As mentioned before, the communication device may be installed in a vehicle. The communication device may act as a user equipment in the mobile network. In another embodiment the communication device may be a user equipment carried by a driver or passenger of the vehicle. The user equipment may be a personal electronic device such as a mobile phone.

If the multicast/broadcast packet has not been successfully received and/or decoded by the second communication device, the method preferably verifies, whether another communication device transmitted a negative acknowledgment indicator and/or a channel quality indicator on the shared control channel as an example of context information. If another communication device transmitted a negative acknowledgment indicator and/or the quality channel indicator on the shared control channel, the second communication device does not transmit a negative acknowledgment indicator and/or the channel quality indicator on the shared control channel. Thereby, network load may be further reduced, since the first communication device retransmits the multicast/broadcast packet to all connected user equipments, if a single communication device transmits a negative acknowledgment indicator and/or channel quality indicator. Multicast/broadcast packets are generally sent to a plurality or all of communication devices within a network and a geographical region thereof, respectively. Therefore, it is from a technological point of view not necessary that all communication devices have to inform the first communication device that a multicast/broadcast packet has not been properly received and/or decoded.

If the multicast/broadcast packet has not been successfully received and/or decoded by the second communication device, the second communication device preferably waits a time span before sending the negative acknowledgment indicator and/or the channel quality indicator, wherein the time span is shorter the lower the channel quality key indicator is. Thereby, the method according to the present invention provides a collision sensitive media access and further reduces network load, since it is clearly determined, which communication device transmits the single negative acknowledgment indicator and/or the single channel quality indicator.

The second communication device may preferably determine, whether the transmission conditions are such that the second communication device can receive the retransmitted multicast/broadcast packet from the first communication device as an example of context information. The second communication device only transmits the negative acknowledgment indicator and/or the channel quality indicator, if the transmission conditions are such that the second communication device can receive the retransmitted multicast/broadcast packet from the first communication device. The transmission conditions as an example of context information may comprise the distance between the first communication device and the second communication device, the velocity of the first communication device and/or the velocity of the second communication device. Further, the transmission conditions may depend on the particular application that transmits data between the first communication device and the second communication device, such as if a car leaves a section of a street. The velocity may be the absolute velocity of the vehicle (with respect to the ground) or may be a relative velocity between two vehicles.

The second communication device may preferably determine an application specific time limit, within which a retransmitted multicast/broadcast packet has to be received by the second communication device. The second communication device may transmit the negative acknowledgment indicator and/or the channel quality indicator only, if the retransmitted multicast/broadcast packet will arrive at the second communication device before the application specific time limit as an example of context information. Each application may have different time limits for receiving information. Generally, in an automotive environment security applications have a shorter time limit for receiving information as compared to an application providing at least one comfort or entertainment function. Thus, the second communication device only transmits the negative acknowledgment indicator and/or the channel quality indicator, if it may be ensured that the retransmitted packet may be properly received by the second communication device for further reducing the network load.

If the first communication device receives the negative acknowledgment indicator and/or the channel quality indicator from the second communication device, the first communication device preferably retransmits the multicast/broadcast packet with a second priority lower than the first priority. Transmission of regularly transmitted multicast/broadcast packets (first transmissions) is prioritized over retransmitted packets. Therefore, the communication devices receive generally more up-to-date information.

The method may preferably determine, whether radio resources are available for retransmitting the multicast/broadcast packet. The first communication device may retransmit the multicast/broadcast packet only, if radio resources are available. Thereby, network congestion may be avoided.

The first communication device may preferably retransmit the multicast/broadcast packet on a second common channel received by the plurality of communication devices. Thereby, collisions with the transmissions on the first common channel, in which the broadcast/multicast packets are generally transmitted, are avoided.

The first communication device may preferably determine an application specific time limit, within which a retransmitted multicast/broadcast packet has to be received by the second communication device. The second communication device only retransmits the multicast/broadcast packet, if the retransmitted multicast/broadcast packet will arrive at the second communication device before the application specific time limit as an example of context information. Network load is reduced, since only packets are retransmitted that will arrive before the application specific time limit at the second communication device.

The first communication device may preferably determine the communication device, which returned the lowest channel quality indicator. The first communication device may adapt at least one radio parameter responsive to the channel quality indicator transmitted by the communication device transmitting the lowest channel quality indicator. Thereby, transmission conditions for at least the communication device receiving the packet with a lowest quality are improved.

A third communication device may preferably determine that the second communication device sent a negative acknowledgment indicator and/or the channel quality indicator concerning a predetermined multicast/broadcast packet as an example of context information. The third communication device may retransmit the predetermined multicast/broadcast packet. The multicast/broadcast packet may be retransmitted to the second communication device and/or to all communication devices. Thereby, a decentralized approach for retransmitting the multicast/broadcast packets is achieved reducing the load of the first communication device. The retransmission may be based on the number of attempts of the second communication device. If the second communication device transmits a plurality of negative acknowledgment indicators and/or quality channel indicators exceeding a predetermined threshold with respect to the same multicast/broadcast packet or with respect to different multicast/broadcast packets, the transmission between the first communication device and second communication device may be distorted or the distance between the first communication device and the second communication device may be too large. Thereby, the third communication device may act as a hub or bridge for retransmitting the lost multicast/broadcast packet in order to further reduce network load and increase quality of the transmission. The retransmission scheme may also be based on distance considerations between the first communication device and the second communication device or based on consideration of time critical applications as further examples of context information. For example, the third communication device may always retransmit a multicast/broadcast packet to the second communication device responsive to a negative acknowledgment indicator and/or channel quality indicator transmitted by the second communication device, such as for a time critical application.

The step of transmitting a negative acknowledgment indicator may preferably comprise sending a previous frame ID and/or the device ID as an indicator for a negative acknowledgment. In other words, the negative acknowledgment indicator may be obsolete, if the second communication device transmits and/or broadcasts the ID of the frame that is lost and/or the ID of the communication device that did not receive a packet. The ID of the frame and device may be unique within a retransmission control region.

The present invention also relates to a computer program product that, when loaded into a memory of a computer comprising a processor, executes the above identified method.

The invention also relates to a controller comprising a receiver, a decoder, a determining device and a feedback device. The receiver is configured to receive a multicast/broadcast packet transmitted from a first communication device. The decoder is configured to decode the received multicast/broadcast packet. The determining device is configured to determine a reception quality indicator of the received multicast/broadcast packet. The feedback device is configured to not sending a channel quality indicator CQI to the first communication device and to not sending an acknowledgement ACK, if the multicast/broadcast packet has been successfully received and decoded. If the multicast/broadcast packet has not been successfully received and/or has not been successfully decoded, the feedback device transmits a negative acknowledgement indicator NACK and/or a channel quality indicator CQI on a shared control channel.

The controller may be further configured as described above with reference to the method.

The controller may further comprise a transmitter configured to transmit a multicast/broadcast packet directly from a first communication device to a plurality of communication devices including a second communication device by a first priority on a first common channel.

The invention discloses a communication device comprising the above controller. The communication device may be a user equipment.

The invention also relates to a vehicle comprising the above communication device.

SHORT DESCRIPTION OF THE DRAWINGS

The present invention is now described with respect to specific embodiments shown in the figures that do not limit the invention and are to be construed merely illustrative, wherein FIG. 1 shows an example of transmissions in an ad-hoc device-to-device network;

DETAILED DESCRIPTION OF THE INVENTION

One embodiment of the invention enables the efficient use of HARQ (Hybrid Automated Repeat Request) and AMC (Adaptive Modulation and Coding) for broadcast transmissions in the case of ad-hoc device-to-device communication (i.e. without network infrastructure). In particular, the proposed mechanism incorporates the below features.

Figure 1:
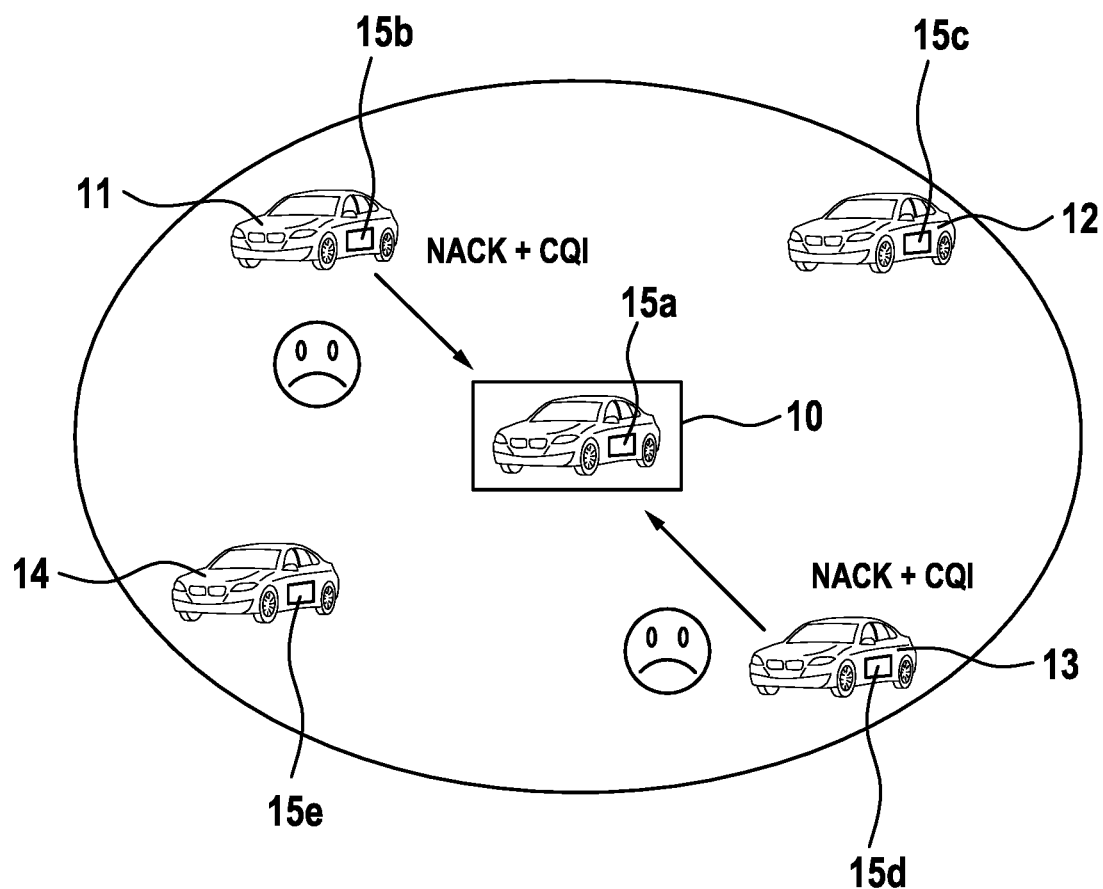

FIG. 1 shows an embodiment, in which a vehicle acting as a wireless transmitter 10 transmits broadcast packets to a plurality of vehicles acting as receivers 11, 12, 13, 14 in an automotive environment, which is a particular application of the present invention. The vehicle may comprise a wireless communication device 15 having a SIM card (Subscriber Identification Module) mounted in a car. Alternatively, a vehicle may be coupled with a mobile phone of a driver or passenger acting a transmitter and/or receiver. The mobile phone may be coupled by Bluetooth or USB (Universal Serial Bus) with the vehicle.

The communication between the vehicles may be a wireless car-to-car communication and/or a communication between a vehicle and a base station. A vehicle may at least send control information to the base station. The wireless network may be based on UMTS, LTE (LTE direct), 5G, IEEE 802.11 or any higher generation system.

In order to reduce the amount of feedback information, only NACKs (accompanied by a corresponding Channel Quality Indicator (CQI) in order to enable AMC) are sent to the transmitter 10, 15a by the receivers 11, 13, 15b, 15d that did not receive the broadcast packets appropriately. This means that a feedback message (i.e. NACK) is only transmitted by the receivers 11, 13, 15b, 15d that could not correctly decode the information as is shown in FIG. 1. Due to the broadcast nature of the communication, it is likely that multiple receivers 11, 13, 15b, 15d fail to decode a message and request a retransmission. The number of redundant NACKs can be reduced by employing any combination of the following options:

Cooperative NACK feedback can be exploited in a system, where the radio resources are slotted at least in the time domain. Receivers 11, 13, 15b, 15d that could not successfully decode the information do not transmit feedback information, if another receiver 11, 13, 15b, 15d has already provided the feedback information for the same transmission in a previous time slot, and the corresponding CQI indicates worse channel conditions.

Cooperative NACK feedback can be extended with the aid of carrier sensing multiple access (CSMA). In this case, a certain radio resource element (e.g., frequency subcarrier and/or time slot) needs to be allocated for the feedback corresponding to a specific transmission and this allocation needs to be forwarded to potential receivers. Receivers 11, 13, 15b, 15d that fail to decode the message employ CSMA in order to compete for the allocated resource element by listening within the resource element for a random amount of time (contention window). When a receiver 11, 13, 15b, 15d gains control over the radio resource element (as a result of having the smallest contention window) and transmits the feedback information, the contending receivers 11, 13, 15b, 15d refrain from providing further NACKs for the considered transmission. The size of the contention window can be proportional to the quality of the channel as reported by the channel quality indicator (CQI), so that receivers experiencing the worst channel condition have priority when accessing the channel by selecting smaller contention windows.

The negative acknowledgement NACK and/or the channel quality indicator CQI may be a message or part of a message.

Further criteria originating from the context-awareness of receivers 11, 13, 15b, 15d based on the context information can also be defined in order to minimize the number of NACKs. For example, receivers 11, 13, 15b, 15d could only send feedback information if they are within a predetermined distance from the original transmitter 10, 15a. The distance could be for instance computed based on information transmitted at the application layer, such as the GNSS position (GPS), or if it can be foreseen that the retransmission would not violate any delay constraints on the delivery of the message.

In addition to NACKs, the receivers provide CQI in order to enable AMC on the transmitter side 10, 15a. It is important to note that every NACK and CQI provided by the receivers is associated with a certain broadcast transmission (and, correspondingly, to a transmitter), for example, by using a determined radio resource element or by providing an ID that unequivocally identifies the transmission. Exploiting this information, the transmitter can configure the retransmissions (e.g. modulation and coding) according to the receiver with the worst channel conditions during the last (re)transmission.

The latency requirements of the considered application also need to be taken into account when configuring the retransmissions. For example, if the maximum tolerable deadline for the information is going to be exceeded by the time of the retransmission, the information is discarded and the retransmission does not take place. Moreover, retransmissions have a lower priority than new transmissions during the allocation of radio resources. In other words, radio resources are only allocated to retransmissions, if these are available after the allocation for the first transmissions.

Cooperative re-transmissions can further improve the reception probability of receivers 11, 13, 15b, 15d experiencing bad reception conditions a further example of context information. The main idea of cooperative re-transmissions is that, after a receiver 11, 13, 15b, 15d fails to decode a packet, the other receivers 12, 14, 15c, 15e located in the proximities, who have successfully decoded the packet can retransmit it in addition to the retransmissions performed by the original transmitter 10, 15a. This additional cooperative retransmissions can take place after listening to the NACK sent by the receiver 11, 13, 15b, 15d for which the packet was not successful decoded, and based on certain criteria (context information), e.g. after observing a certain number of re-transmissions from the original transmitter 10. The use of cooperative retransmissions increase the reliability of the communication as a result of the additional information being transmitted to the receiver 11, 13, 15b, 15d, and also due to the fact, that the channel conditions between the receiver 11, 13, 15b, 15d and nearby cooperative transmitters 12, 14, 15c, 15e are expected to be better (e.g. higher SINR) than those between the receiver 11, 13, 15b, 15d and the original transmitter 10, 15a. In addition to this, the additional reliability provided by the cooperative retransmissions can reduce the latency, since the additional information might allow the receiver to successfully decode information in a shorter timespan.

Figure 2:
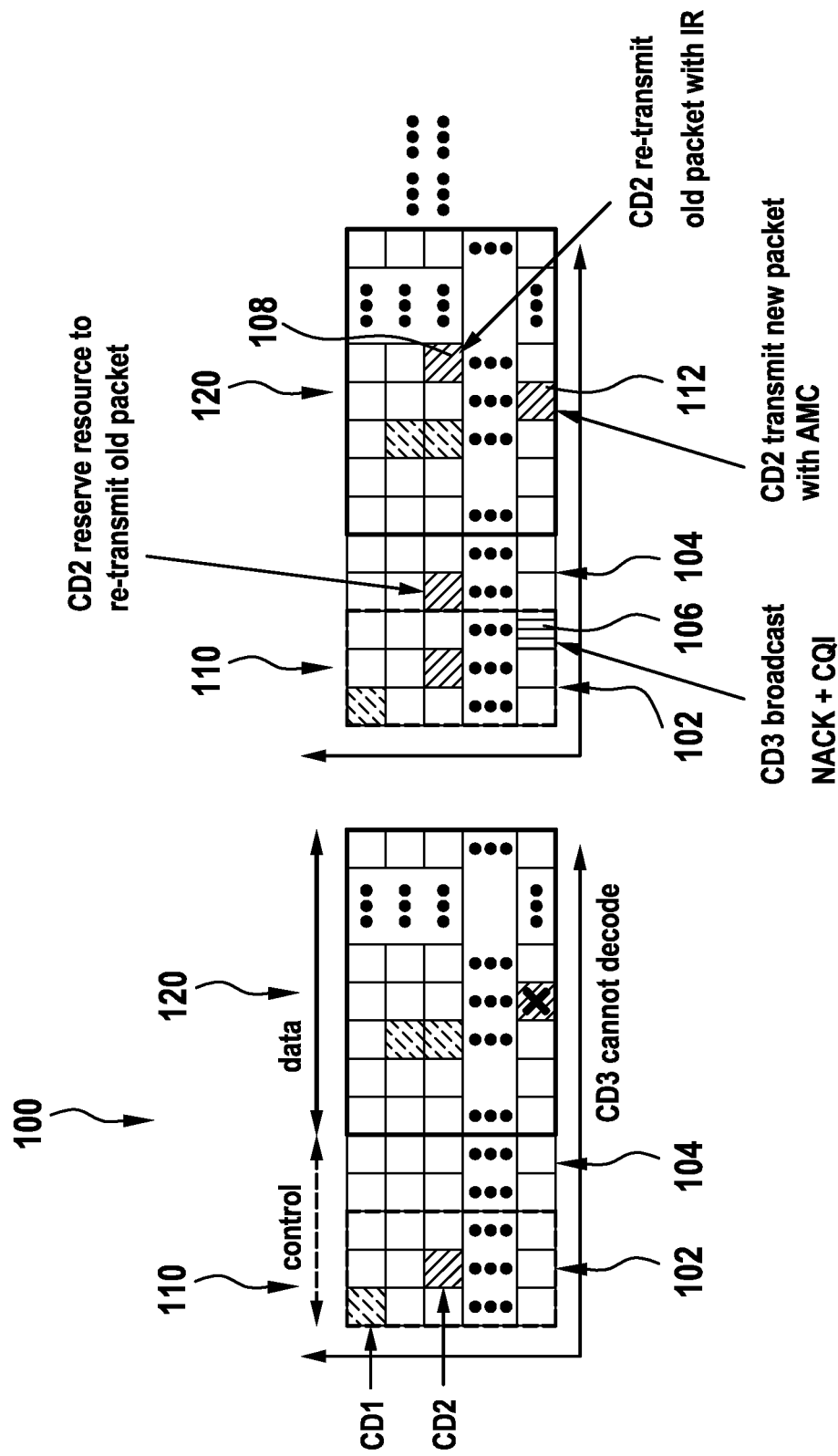
FIG. 2 shows proposed radio frame structures.

One possible embodiment of the disclosed invention can be based on the radio frame structure for normal HARQ with AMC in "control/data split" radio frame structure, where control channel and data channel are segmented, as shown in FIG. 2.

In the "control/data split" radio frame structure 100 via a control channel 110 a device always listens and decodes all subframes to have distributed coordination with neighbor devices. Each device decodes on specific resources in the data channel 120 for reception if it is paged in the control channel 110 phase. Each device transmits on its reserved specific resources of the data channel 120.

Control channel 110 comprises a new data transmission control section 102 and a re-transmission data transmission control section 104. As shown in FIG. 2, the former is in the first part of control channel and the latter is in the second part. Control channel 110 is used for physical layer control and medium access control among all devices e.g., fine-tuned synchronization, direct neighbor discovery, paging, distributed resource reservation.

As shown in FIG. 2, the following five steps show how HARQ with AMC can be done in a "control/data split" radio frame structure for reliable V2X broadcast communications. The previous frame ID serves as indicator of a NACK message ID. Also, feedback (NACK+CQI) message can be either in control channel or data channel.

Step 1: CD1 and CD2 broadcast packets; All proximity CDs successfully decode, but CD3 cannot decode packet from CD2 (e.g., due to poor SNR).

Step 2: CD3 broadcast NACK 106 of the packet from CD2 and the CQI of the resource used by CD2's transmission.

Step 3: CD2 decodes the NACK+CQI report 106 from CD3; CD2 checks this packet transmission deadline e.g., no retransmissions beyond deadline, as an example of context information.

Step 4: CD2 reserves new resource 108 for re-transmitting the old packet, i.e., incremental redundancy/chase combing by giving priority to new packet transmissions 112 i.e., old packet 108 only be re-transmit if there is resource left.

Step 5: For new packet transmission 112, CD2 adopt AMC on old resource based on CQI report of the worst SNR receiver, to further improve the reliability.

Figure 3:
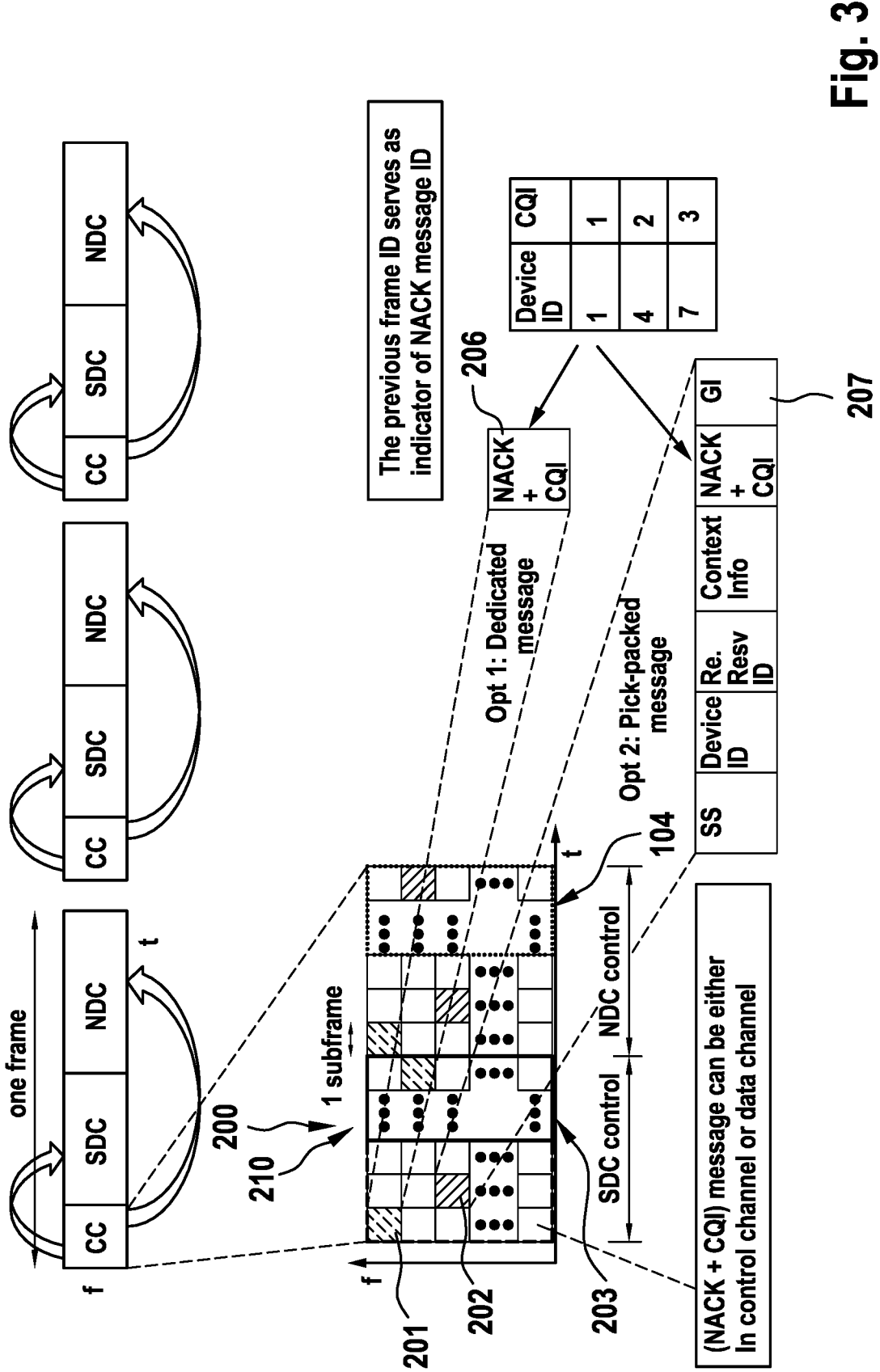
FIG. 3 shows a frame structure with compressed HARQ.

As shown in FIG. 3, this is an enhanced frame structure 200 to support compressed HARQ. The control part 210 of the frame comprises retransmission control regions 203, 204. The re-transmission feedbacks 201, 202 are either being sent as dedicated message 206 with (NACK+CQI) in the control channel or pick packed 207 with the control messages.

FIG. 3 also shows the format of re-transmission feedback message 206, comprising a device ID and CQI. The NACK message ID is not explicitly carried in the feedback message. Instead, the previous frame ID serves as indicator of NACK message ID.

Figure 4:
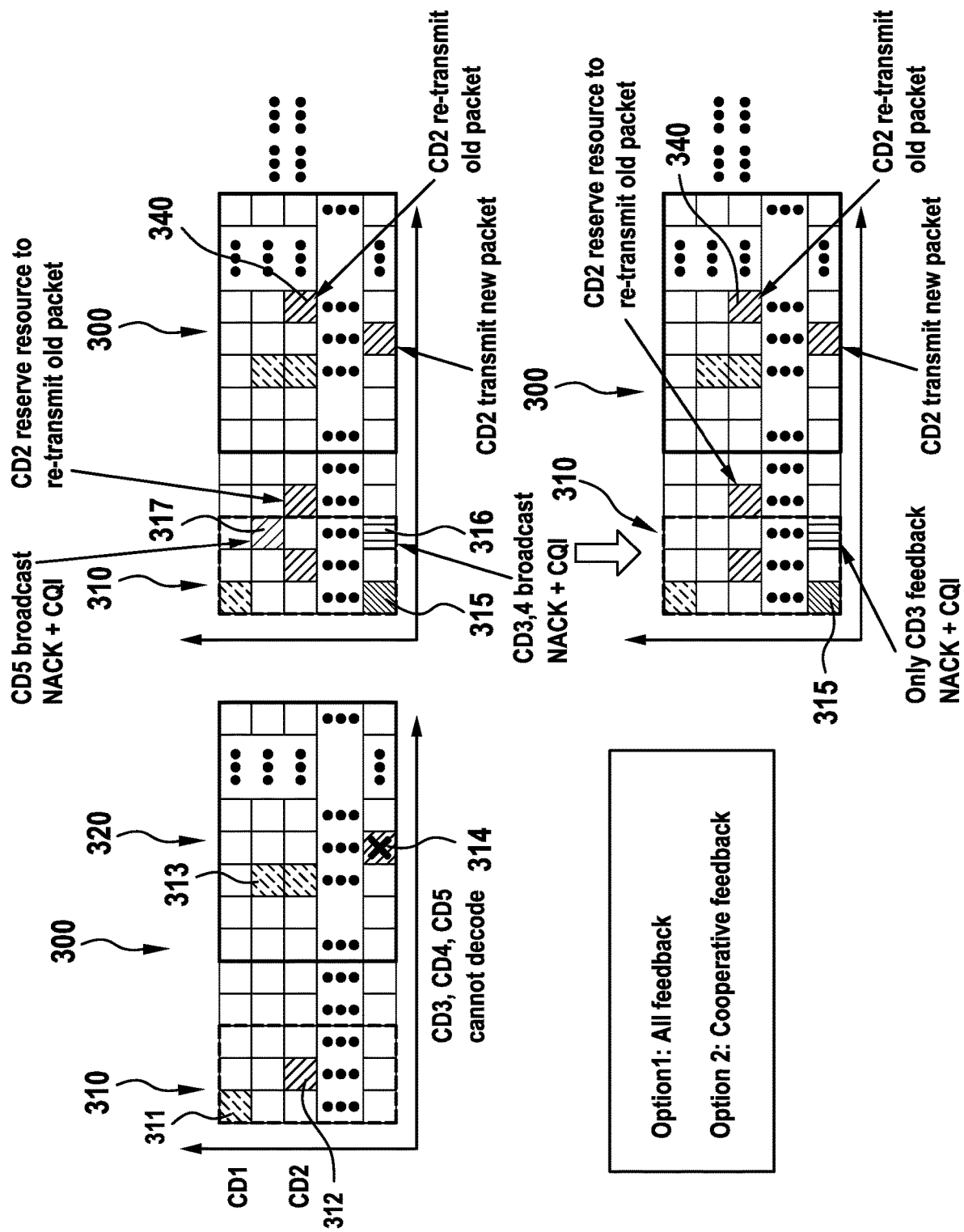
FIG. 4 shows a radio frame structure for compressed HARQ with AMC.

FIG. 4 shows how compressed HARQ with AMC can be done in a control/data split radio frame structure 300 for reliable V2X broadcast communications. CD1 and CD2 firstly select the control channel resource 310 and transmit control packet 311, 312 which includes the reserved resource 313, 314 in data channel 320. CD1 and CD2 then broadcast in the data channel 320 to proximity neighbors. Unfortunately, CD3, CD4, and CD5 cannot decode the data packet 314 from CD2, thus a broadcast re-transmission is needed.

With ordinary HARQ/AMC, i.e., option 1 "All feedback", CD2 decodes the (NACK+CQI) reports 315, 316, 317 from CD3, CD4, and CD5 in the first part of control channel 310; Then, CD2 decide AMC based on the worst receiver. The problem is the introduced large overhead of the (NACK+CQI) reports from the failed receivers. It may congest the control channel, when the number of neighboring devices are large.

With the compressed HARQ/AMC, i.e., option 2: "Cooperative feedback", once CD4 and CD5 decode CD3's feedback 315 to CD2, CD4 and CD5 do not send feedback to CD2 if CD3 already has worse SINR than CD4 and CD5; If yes, as it is the case in FIG. 3, CD2 will select the AMC mode based on feedback from the first receiver with the worst SINR, i.e., CD3. By transmitting in the AMC corresponding to the worst SINR receiver CD3, it ensures the reliable data receiving at CD4 and CD5. Option 2 achieves more scalability in the control channel, by smartly compressing the feedback information in a distributed way.

Figure 5:
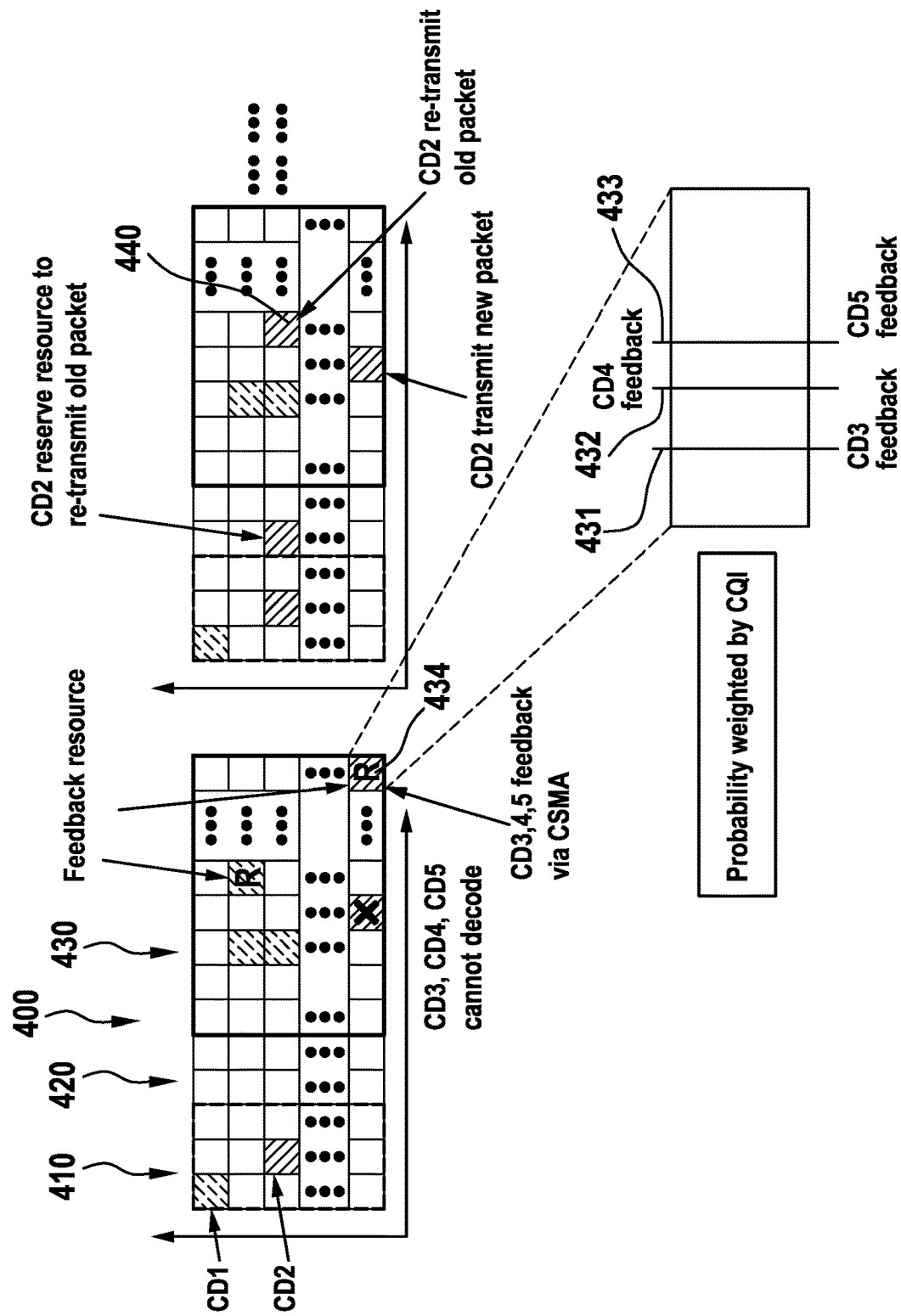
FIG. 5 shows radio frame structures for compressed feedback via collision sensitive media access.

As shown in FIG. 5, to avoid the potential collisions in the feedback from multiple receivers, option 3, i.e. CSMA (carrier-sensing multiple access) based feedback can be employed. Each receiver senses a random period of time in the feedback resource block 434. The receiver which happens to sense the shortest period of time can capture the feedback resource block. The transmitter only receives the (NAC+CQI) from the receiver that captures the feedback resource.

As shown in FIG. 4, CD 3, CD 4, and CD 5 all want to send feedback messages 431, 432, 433 to the transmitter, thus each of them perform a random period of sensing time. CD 3 happens to select a shortest period of sensing time, thus it captures the feedback resource block 434. CD 4 and CD 5 sense that the resource block has been occupied and thus do not send feedback messages.

Figure 6:
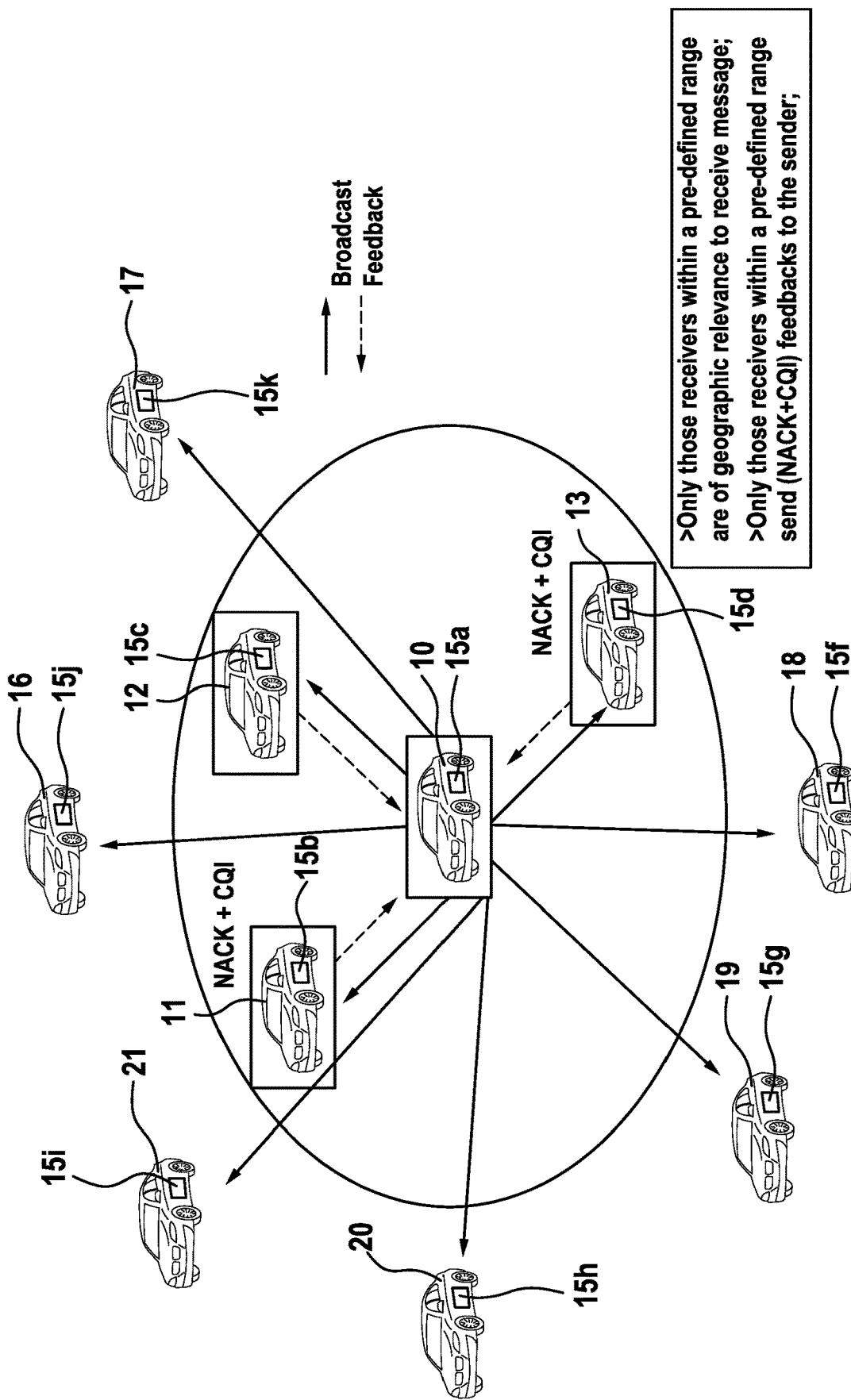
FIG. 6 shows a embodiment with context aware feedback.

FIG. 6 shows the option 4 of distributed compressed feedback: context-aware feedback scheme. Receiver 11, 12, 13, 16, 17, 18, 19, 20, 21 decide whether to request retransmission based on the context information of a transmitter (position, velocity, application), e.g., receiver 11, 12, 13, 15b, 15c, 15d request retransmission, if the transmitter is within a distance of 200 m. Context information can be included in a control message and decoded in the control channel. As shown in FIG. 6, only those receivers within a pre-defined range are of geographic relevance to receive message; Only those receivers 11, 12, 13, 15b, 15c, 15d within a pre-defined range send (NACK+CQI) feedbacks to the sender.

Figure 7:
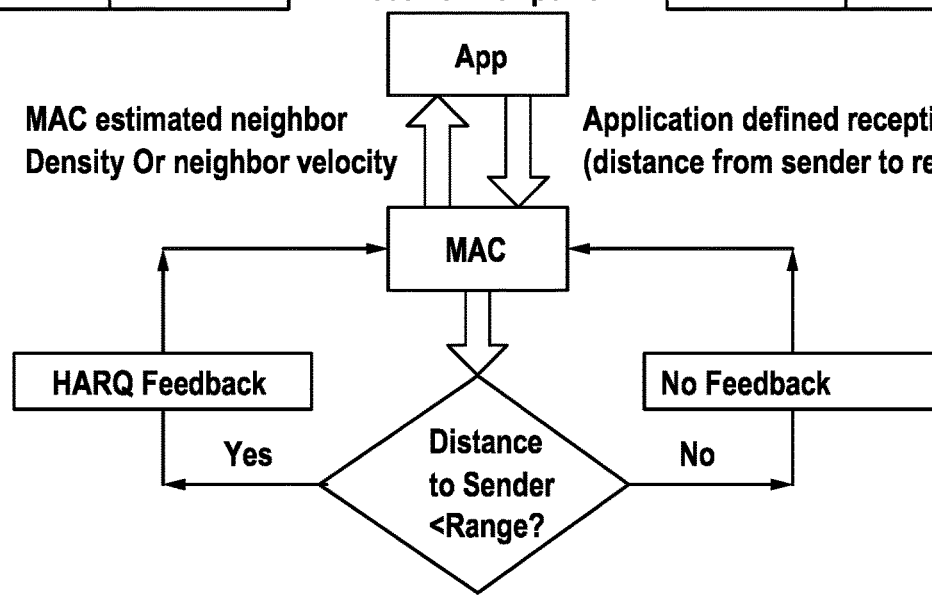
FIG. 7 shows a flow diagram for two embodiments.

FIG. 7 shows the detailed implementation of context-aware feedback, as the option 4 of distributed compressed feedback. As shown in FIG. 7, there are two options to define the reception range:

Option 1: Application specific reception range based on neighbor density;

Option 2: Application specific reception range based on neighbor velocity.

FIG. 7 also shows the flow-chart on the procedures of context-aware feedback.

There is strong interaction between application layer and MAC layer to adapt the reception range based on the neighbor context and context information, respectively.

Figure 8:
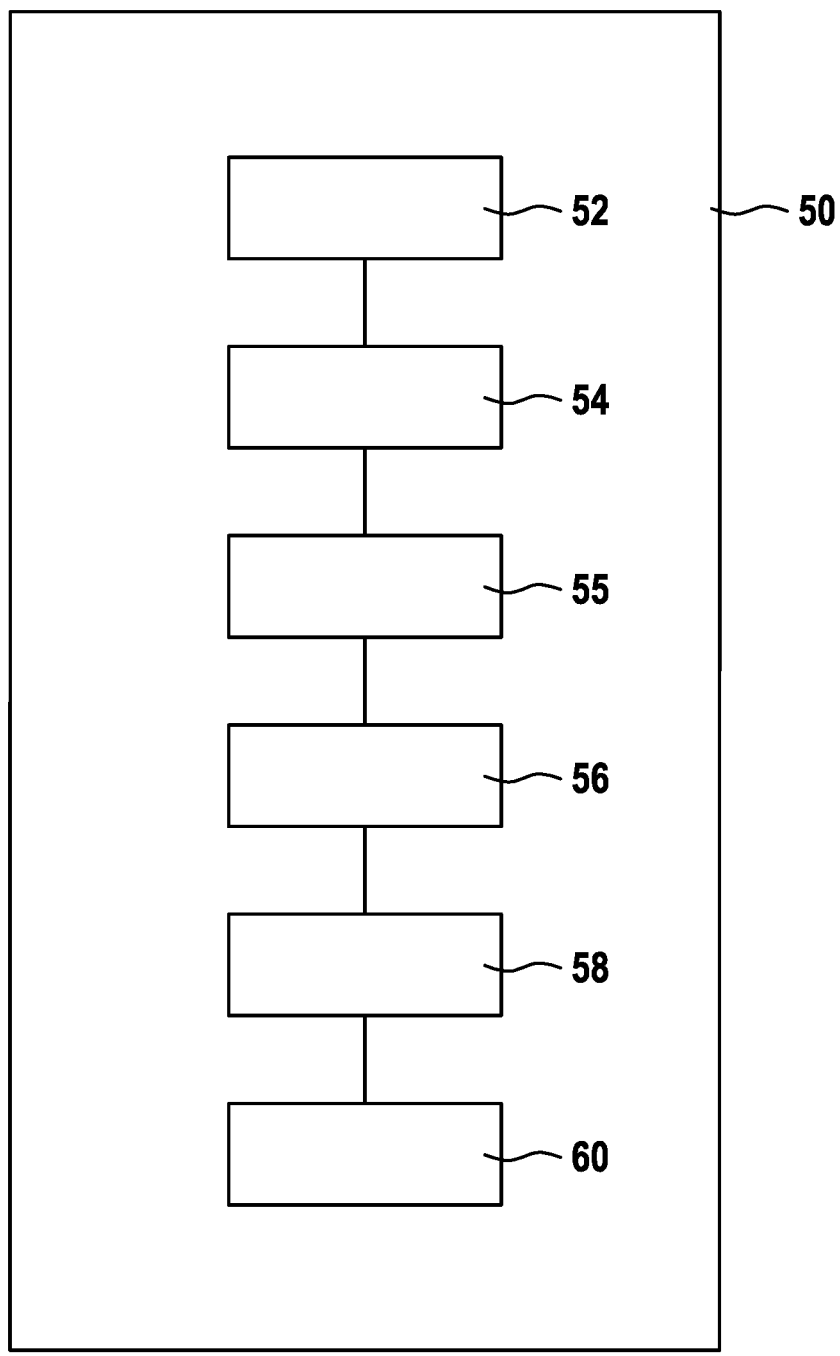
FIG. 8 shows a block diagram of a controller.

Reference is made to FIG. 8, showing a controller 50 comprising a receiver 52, a decoder 54, a context determining device 55, a quality determining device 56 and a feedback device 58. The receiver 50 is configured to receive a data packet, such as a multicast/broadcast packet, transmitted from a first communication device 15. The decoder 54 is configured to decode the received data packet. The context determining device 55 is adapted to determine context information related to the data packet. The quality determining device 56 is configured to determine a reception quality indicator of the received data packet. The feedback device 58 is configured to not sending a channel quality indicator CQI to the first communication device and to not sending an acknowledgement ACK, if the multicast/broadcast packet has been successfully received and decoded. If the multicast/broadcast packet has not been successfully received and/or not been successfully decoded, the feedback device transmits a negative acknowledgement indicator NACK and/or a channel quality indicator CQI on a shared control channel, if the context information indicates that the negative acknowledgement and/or the quality channel indicator is to be sent.

The controller 50 may further comprise a transmitter 60 configured to transmit a multicast/broadcast packet directly from a first communication device to a plurality of communication devices including a second communication device by a first priority on a first common channel.

The communication device 15 in the vehicle 10, 11, 12, 13, 14, 16, 17, 18, 19, 20, 21 may comprise the controller 50.

The proposed invention increases the reliability of ad-hoc device-to-device communications by enabling in an efficient manner the use of HARQ and AMC for broadcasting transmissions, which normally cannot use these mechanisms due to scalability problems. Advanced driver assistance services, for instance those based on cooperative awareness, which normally rely on the exchange of messages between traffic participants in an ad-hoc manner by means of broadcast transmissions, can benefit significantly from the proposed invention. In this sense, the invention contributes to ensuring the timely reception of safety critical messages, and therefore, to increase the safety of drivers, passengers and vulnerable road users.

The invention claimed is:

1. A method for receiving a data packet from a first wireless communication device by a second wireless communication device by device-to-device communication in a wireless network, the method comprising the following steps:

awaiting the data packet at the second wireless communication device;

determining based on transmission conditions of the device-to-device communication at the second wireless communication device, whether the second wireless communication device receives a retransmitted data packet of the data packet from the first wireless communication device within a predetermined time limit;

in response to the data packet is not having been received successfully, controlling a transmission of a negative acknowledgement indicator, NACK, and/or transmission of a channel quality indicator, CQI, by the second wireless communication device to the first wireless communication device by transmitting the NACK and/or the CQI, only if the retransmitted data packet arrives at the second wireless communication device within the predetermined time limit; and in response to the data packet is having not been successfully received, waiting a time span before transmitting the NACK and/or the CQI, wherein the time span depends on the CQI.

2. The method according to claim 1, wherein the step of transmitting the NACK and/or the CQI comprises a broadcast/multicast transmission.

3. The method according to claim 2, further comprising the following step:

receiving a re-transmitted packet of the data packet by a third communication device.

4. The method according to claim 1, further comprising the steps of:

determining whether another wireless communication device transmits a NACK and/or a CQI; and not transmitting a NACK and/or a CQI, in response to the other wireless communication device having transmitted, in particular having transmitted a NACK and/or a CQI related to the data packet.

5. The method according to claim 1, further comprising the steps of:

determining at least one CQI transmitted by another wireless communication device related to the data packet; and not transmitting a NACK and/or a CQI, in response to at least one CQI having been transmitted by another wireless communication device being worse than the CQI determined by the second communication device.

6. The method according to claim 1, further comprising the steps of:

determining a distance of the second wireless communication device to a source of the data packet; and transmitting the NACK and/or the CQI, in response to the distance having exceeded a predefined threshold.

7. A controller configured to perform the method according to claim 1.

8. A wireless communication device comprising the controller according to claim 7.

9. A vehicle comprising the wireless communication device according to claim 8.

* * * * *